US007192267B2

(12) United States Patent
Glucksman et al.

(10) Patent No.: US 7,192,267 B2
(45) Date of Patent: Mar. 20, 2007

(54) POWER DOUGH AND FOOD MATERIALS PRESS

(75) Inventors: Dov Z. Glucksman, Wenham, MA (US); Gary P. McGonagle, Lynn, MA (US); Laura J. Nickerson, Andover, MA (US)

(73) Assignee: Meyer Intellectual Properties Limited (VG)

( * ) Notice: Subject to any disclaimer, the term of this patent is extended or adjusted under 35 U.S.C. 154(b) by 241 days.

(21) Appl. No.: 10/754,253

(22) Filed: Jan. 8, 2004

(65) Prior Publication Data
US 2004/0187706 A1 Sep. 30, 2004

Related U.S. Application Data

(60) Provisional application No. 60/439,421, filed on Jan. 9, 2003.

(51) Int. Cl.
*A01J 21/02* (2006.01)
*G01F 11/00* (2006.01)
(52) U.S. Cl. .................. 425/376.1; 425/449; 222/326; 222/333; 222/390

(58) Field of Classification Search ............... 222/390, 222/326, 333, 327; 425/449, 457, 376.1; 99/450.1, 450.2, 494
See application file for complete search history.

(56) References Cited

U.S. PATENT DOCUMENTS

| 3,984,033 | A | * | 10/1976 | Groth et al. | ................ 222/333 |
| D247,414 | S | * | 3/1978 | Watkins et al. | ............. D7/368 |
| 4,114,781 | A | * | 9/1978 | Doyel | ........................ 222/326 |
| 5,052,593 | A | * | 10/1991 | Grome et al. | ............... 222/333 |
| 5,375,740 | A | * | 12/1994 | Umetsu et al. | ............... 222/95 |
| 5,762,239 | A | * | 6/1998 | Cossette | .................... 222/326 |
| 5,871,299 | A | * | 2/1999 | Lai | ......................... 403/322.1 |
| 5,993,188 | A | * | 11/1999 | Mak | ........................ 425/376.1 |
| 6,488,180 | B1 | * | 12/2002 | Bayat | ......................... 222/137 |
| 6,701,828 | B1 | * | 3/2004 | Burns et al. | ............... 99/450.2 |

OTHER PUBLICATIONS

Salton, Inc. (2002). *Electric Cookiepress Owner's Manual Model No. CKM25*, pp. 1-7.
Hamilton Beach, Inc., (1993). *SuperShooter® Cordless Cookie Press & Food Decorator Owner's Manual*, 7 pages.

* cited by examiner

*Primary Examiner*—James P. Mackey
*Assistant Examiner*—Maria Veronica Ewald
(74) *Attorney, Agent, or Firm*—Edward S. Sherman

(57) ABSTRACT

A cookie press includes a helically-threaded rod that advances forward as it is being rotated about its axis by a gear. As a result, a plunger is advanced and pushes dough down a barrel and squeezes the dough through an aperture at the end of the barrel.

6 Claims, 7 Drawing Sheets

SECTION A-A

SECTION A-A
FIG. 1

SECTION B-B
FIG. 2

*SECTION A-A*
FIG. 7

*SECTION B-B*
FIG. 8

SECTION A-A
FIG. 12

POWER DOUGH AND FOOD MATERIALS PRESS

CROSS-REFERENCE TO RELATED APPLICATIONS

This application claims the benefit of U.S. Provisional Patent Application No. 60/439,421, filed on Jan. 9, 2003, the contents of which are incorporated herein by reference in their entirety.

BACKGROUND OF THE INVENTION

Cookie guns are very popular kitchen gadgets for making cookies of different shapes from a variety of different recipes of dough. Most cookie guns are manually operated.

A typical cookie gun includes an elongated cylinder in which dough is placed. One end of the cylinder ends with an extrusion disc shaped in a manner to cause the dough flowing through it to be extruded in a certain shape. The other end of the cylinder is provided with a plunger that is at the end of a push rod. The rod is pushed forward into the cylinder so the plunger pushes the dough out of the other end through the extrusion disc. There are a number of methods for propelling the rod and plunger forward into the cylinder. Most cookie guns employ a ratchet type mechanism and a squeezable handle that engages the ratchet mechanism to push the plunger.

Caulking guns are similar to cookie guns as they deliver a viscous substance. We recognize that there are many power-type caulking guns in the art.

SUMMARY OF THE INVENTION

In accordance with one aspect, a food press kit is provided. A housing and a plurality of elongated barrels are provided, each elongated barrel characterized by selected different crosswise dimensions along at least a portion of that elongated barrel. A plurality of plungers are provided, each plunger having crosswise dimensions corresponding to the crosswise dimensions by which a separate one of the elongated barrels is characterized. At least one extrusion member is provided, adapted to fit at an end of the elongated barrels. The elongated barrels are selectively attachable to the housing. A rod extends from a rod-moving mechanism within the housing and, when one of the elongated barrels is attached to the housing, at least partially through the attached elongated barrel. The plungers are attachable to the rod to force the food material through the extrusion member. By virtue of the plurality of elongated barrels having selected different crosswise dimensions, the food material is flexible for working with food material of various viscosities.

In accordance with another broad aspect, a hand-held motorized apparatus to press food product includes a housing that houses a motor. An elongated barrel holds the food product. A threaded rod is configured for advancement along the elongated barrel as the threaded rod is turned. An extrusion member is located at an end of the elongated barrel. A plunger is coupled to the rod and movable therewith along the elongated barrel to press the food product out the extrusion member. A coupling mechanism couples the rotation of the motor to turn the rod.

In accordance with yet another broad aspect, a hand-held apparatus is provided to press food. The apparatus includes housing and also includes an elongated barrel to hold the food product. A plunger and a plunger moving mechanism are provided, the plunger moving mechanism coupled to the housing and configured to move the plunger along the barrel to move the food material along the barrel and to force the moved food material out of the barrel through an extrusion member. The plunger includes a substantially rigid portion dimensioned to substantially match a crosswise dimension of the barrel and a flexible side wall portion that, as the plunger moves the food material along the barrel, tends to seal against the barrel, thereby creating a sliding seal.

In accordance with yet another broad aspect, a hand-held apparatus to press food is provided. A housing includes a motor housed therein. An elongated barrel holds the food product. A plunger and plunger moving mechanism are provided. The plunger moving mechanism is coupled to the motor and is configured to move the plunger along the barrel to move the food material along the barrel and to force the moved food material out of the barrel through an extrusion member. The housing includes a battery compartment housed therein, the battery compartment including a door that is removably hinged to the housing, the battery compartment being fully exposed when the battery compartment door is fully removed.

This section is a summary only, and no attempt was made to capture all aspects of what is considered to be the invention. What is the invention is determinable from the claims in the application as filed and as the claims are supplemented and/or amended during prosecution of the patent application.

BRIEF DESCRIPTION OF DRAWINGS

FIG. 1 is a side cutaway view of a cookie press with a "large" barrel, while FIG. 2 is a rear cutaway view of the FIG. 1 cookie press.

FIG. 5, top view; and FIG. 6, perspective view).

FIG. 7 is a side cutaway of a cookie press with a "small" barrel, while

FIGS. 9 and 10 illustrate how the threaded block of the drive mechanism interacts with the engaging rod, with FIG. 9 illustrating the threaded rod being engaged by the threaded block while FIG. 10 illustrates the threaded rod being disengaged from the threaded block.

DETAILED DESCRIPTION

Figures 1, 2:
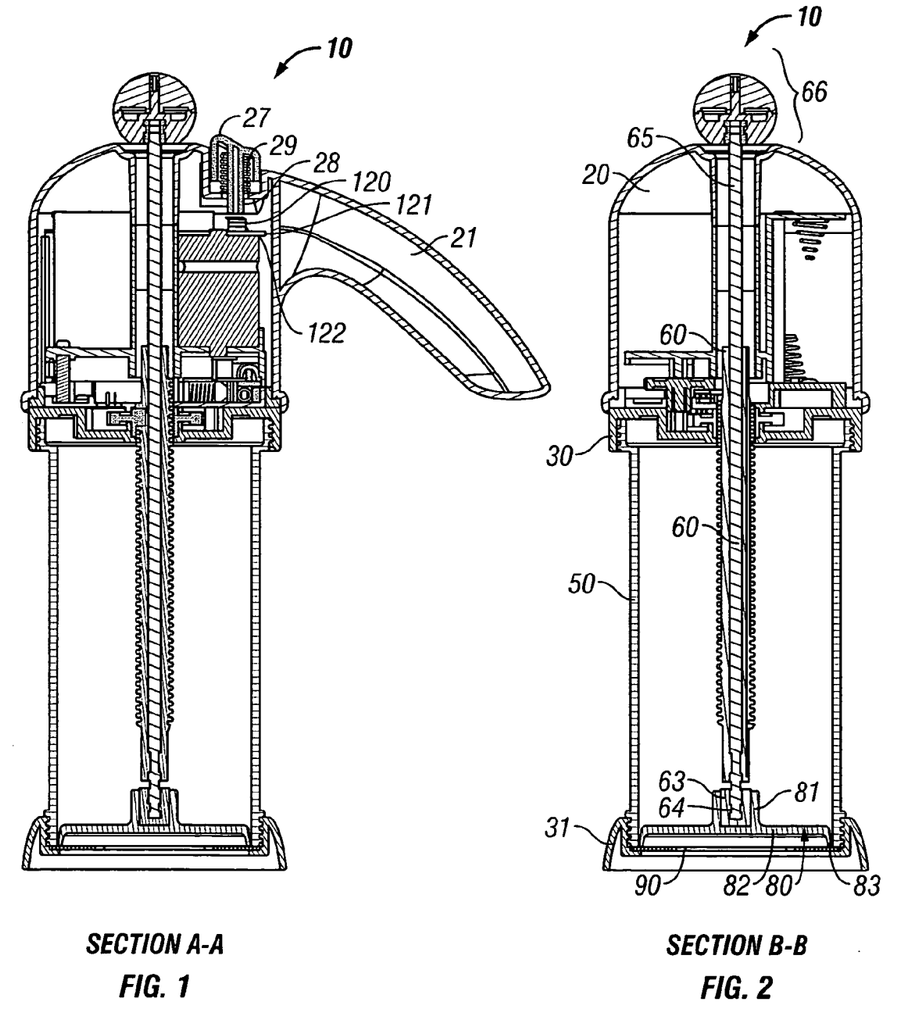

A cookie press includes an elongated barrel 50 that is fillable with cookie dough (not shown). The barrels of the cookie press are essentially cylindrical in cross section and are fitted with a male-thread on either end. One end threads into a female thread 30 located at the bottom of the power unit. The second thread receives an internally flanged threaded ring 31 that retains an extrusion disc 90 through which the dough is pushed out. The shape of the opening in the extrusion disc corresponds to the shape of the cookie desired to be formed. The cookie forming extrusion disc can also be replaced with a cream-dispensing funnel with a wide inlet and a narrow tip. The narrow tip is fashioned with a cross section commensurate with the shape that is desired for the cream being dispensed.

Figures 13, 14:
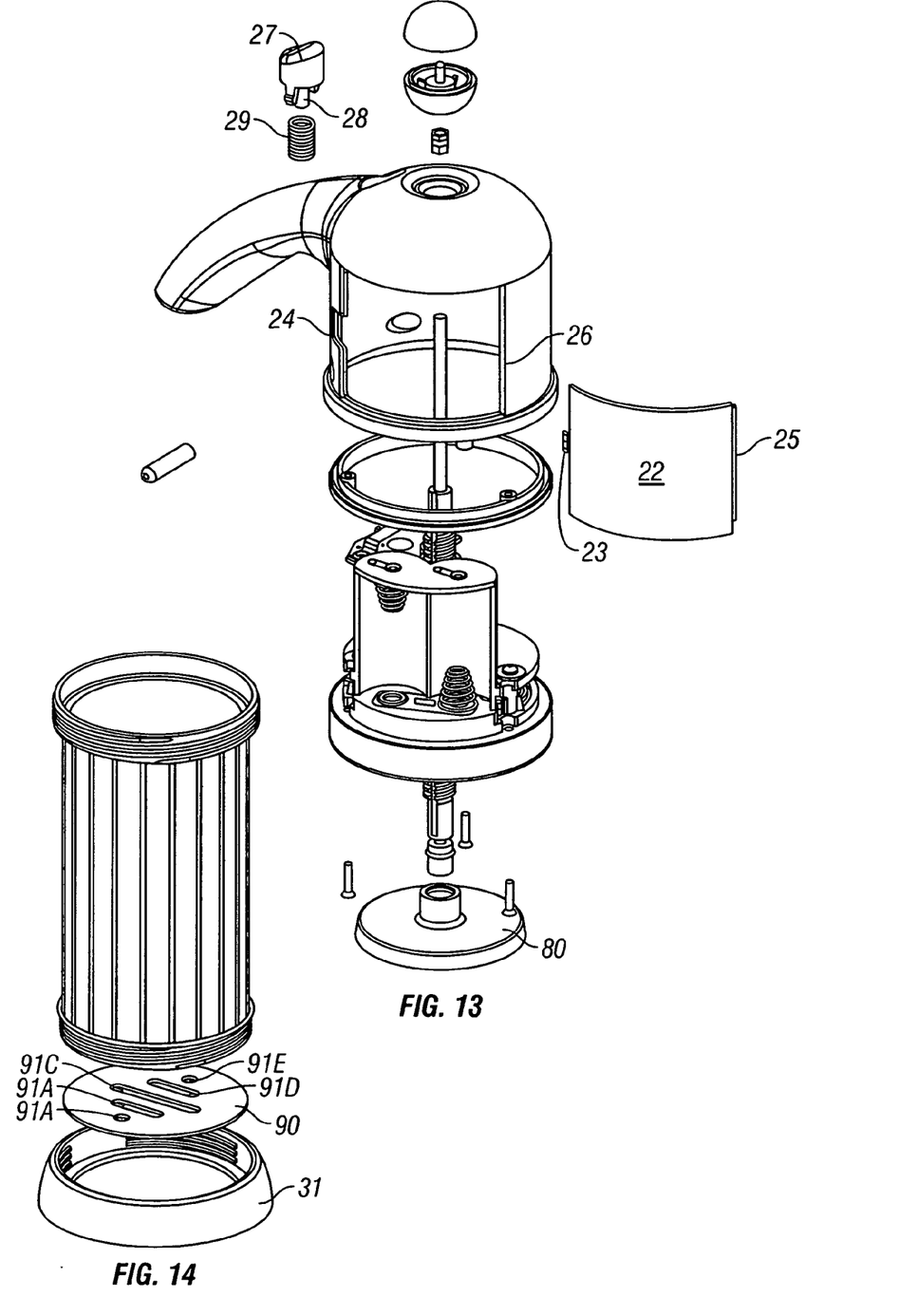
FIG. 13 is an exploded view of the battery compartment.
FIG. 14 is an exploded view of the extrusion disc portion of the cookie press.

There are many different extrusion discs 90 that come with each cookie press. Each disc extrudes the dough in a different shape. For the purpose of the present description, one disc is shown that features an aperture with a number of openings designated as 91 A through E. These openings create a cookie shaped as a "Christmas tree". Other discs feature one or more openings shaped in a manner that enables the dough to be formed in desired shapes when deposited on a baking tray.

Within the barrel is a plunger 80 operable to push the dough along the barrel 50 and through the aperture 90. A threaded rod 60 pushes the plunger forward. The threaded rod, which includes a helical thread 61, is advanced forward as it is rotated about its axis by a gear 75 with a bore 77 having an inwardly projecting pin 78. The pin rides in an axial track 62 that runs along the entire length of the threaded rod 60. The threaded rod thread 61 engages a section of a mating thread 101 that is part of a block 100 that remains stationary. As a result of the threaded rod rotating, while engaging the stationary thread, it is advanced, thereby advancing the plunger that pushes the dough in the barrel and squeezing the dough through the aperture at the end of the barrel.

The threaded rod 60 may be constructed as follows. The threaded portion is molded over a stainless steel rod 65. The stainless steel rod 65 provides the structure with strength. The presence of the stainless steel rod simplifies the attachment of the pull knob 66 that is threaded on the stainless steel rod. On the other end of the rod, there is a molded plastic plug 63, which is also molded over the stainless steel rod. The plastic plug 63 attaches to the plunger. To keep the plug 63 on the rod 65, there is a narrowing in the rod forming a recess 64. When the plug 63 is molded over the rod 65, the plastic fills the recess 64. When the plastic hardens, the plug is "locked" on to the rod 65 by the "undercut" created between the plug and the rod.

Figure 4:
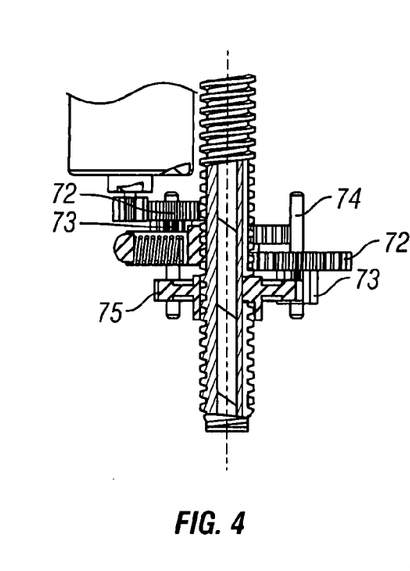
FIGS. 4, 5 and 6 illustrate the drive portion of the cookie press from various views (FIG. 4, side view.
Figure 5:
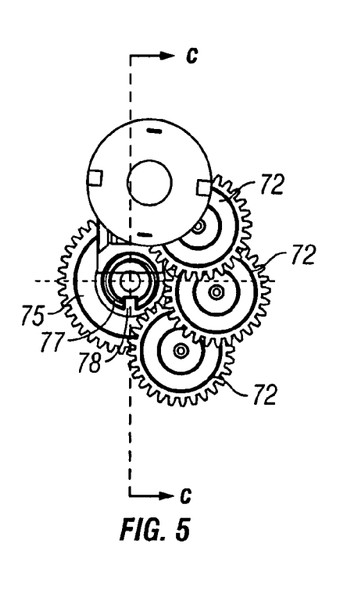
Figure 6:
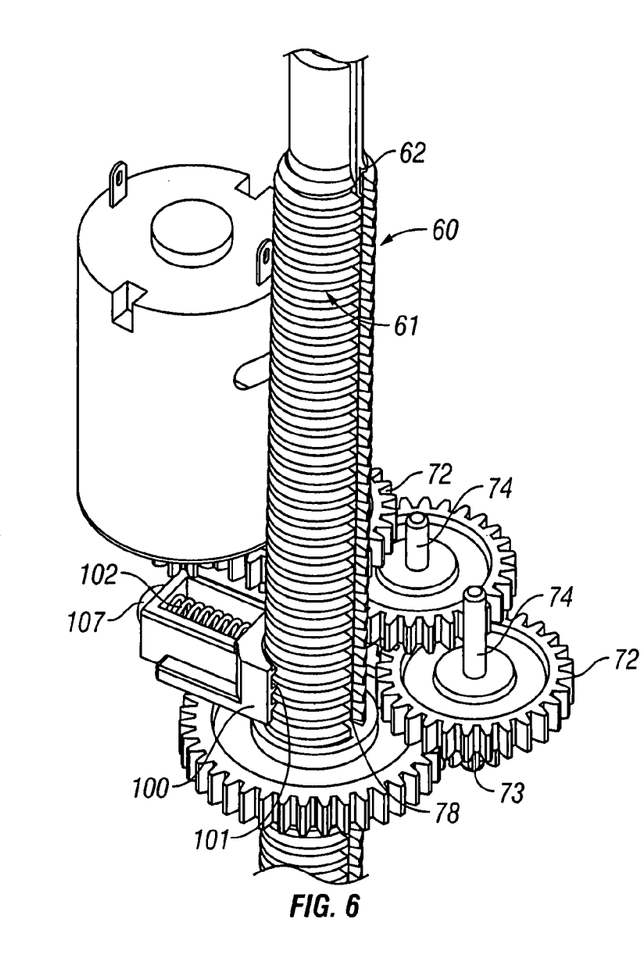

The drive-mechanism to convert the rotational motion of the motor at a relatively high speed to the linear motion of the plunger is now described. In order to reduce the high rotational speed of the motor, a series of three gears is used, each gear including a small diameter pinion 73 and a large diameter gear 72. Each gear spins about a steel pin 74 that acts as a shaft. The friction coefficient between the gear and the pin is low, due to the particular properties of the materials and the very fine surface finish of the stainless steel pin. The amount of speed reduction achieved by each gear is the ratio of the diameters (or the number of teeth) of the gear to the pinion. In a particular case, shown in the figures, the ratio of each of the three gears is 2.8 to 1. Thus, the total speed reduction from the motor to the third gear is 22 to 1. The third gear engages a fourth gear that rotates the threaded-rod by engaging the latter through a single tooth located on the bore of the gear. That gear features a reduction ratio of 3.8 to 1, resulting in a combined reduction rate of 83 to 1. The threaded rod thus rotates at a speed of approximately 90 rpm, while the motor that drives the threaded-rod rotates at 8000 rpm.

Figure 9:
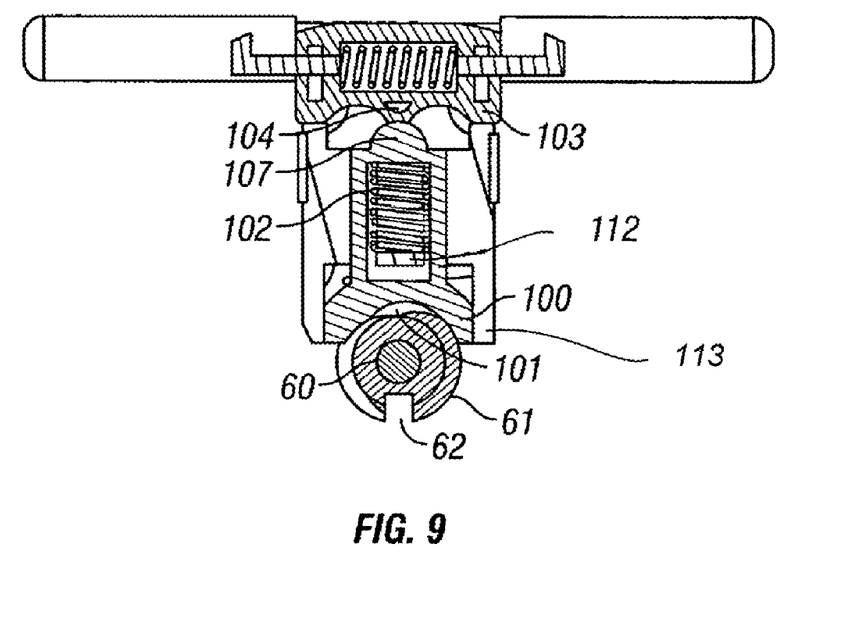
Figure 10:
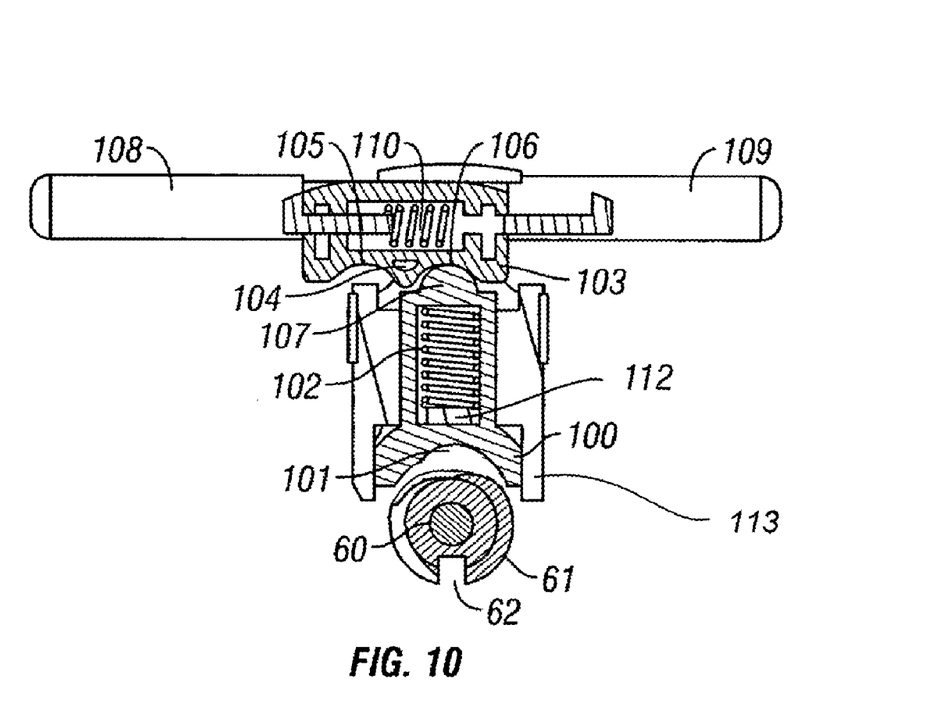

When the plunger reaches the face of the disc at the end of the barrel, namely when all the dough had been dispensed, the plunger is returned to its staffing point, namely to the top of the barrel. To do so, the block 100 containing the mating thread 101 to the thread 61 of the threaded rod is caused to disengage the threaded rod, which can then be retracted easily by pulling the knob 66 that is attached to the threaded rod end. Under normal operating conditions, the threaded block 100 is forced against the threaded rod by a second block 103 that includes a projection 104 surrounded by two recesses 105 and 106. When the second block 103 is in its normal position (FIG. 9), its projecting portion engages a plastic pin 107 that is part of the block 100. Plastic pin 107 extends outward as bulbous projection from the portion of threaded block 100 having a cavity that houses spring 102. On the other hand, when the second block is pushed to the left or the right, one of the recesses 105, 106 lines up with the pin 107. The spring 102 having the lower end fixed against a separate flange 112 is now free to expand as shown in FIG. 10, urging the surrounding pin 107 upward and causing the threaded block to retract and to disengage from the threaded rod, allowing it to be freely retracted. The difference in height between the projection 104 and the recesses 105 and 106 may be at least equal to the difference between the root diameter and the tip diameter of the threaded rod. (When the pin 107 is pushed by the spring 102 into the recess 105 or 106, the threaded rod thread is clear of the thread 101 of the block 100 and the threaded rod can be easily pulled back by the knob 66.) Flange 112 extends upward form support base 113, with plastic pin 107, sliding upward and downward on support base 113. Support base 113 is fixed in position, being attached indirectly to the elongated barrel 50 and motor housing 20.

The block 103 features two extensions 108 and 109. These extensions extend beyond the periphery of the motor housing 20. The user may push one extension or the other inwardly, thereby aligning either the recess 105 or 106 with the pin 107. When the user releases the pressure on the extension 108 or 109, the spring 110 causes the block 103 to return to its normal position, which also returns block 100 to its normal position. In turn, the threaded rod is caused to engage the thread 101 of the block 100.

Figure 3:
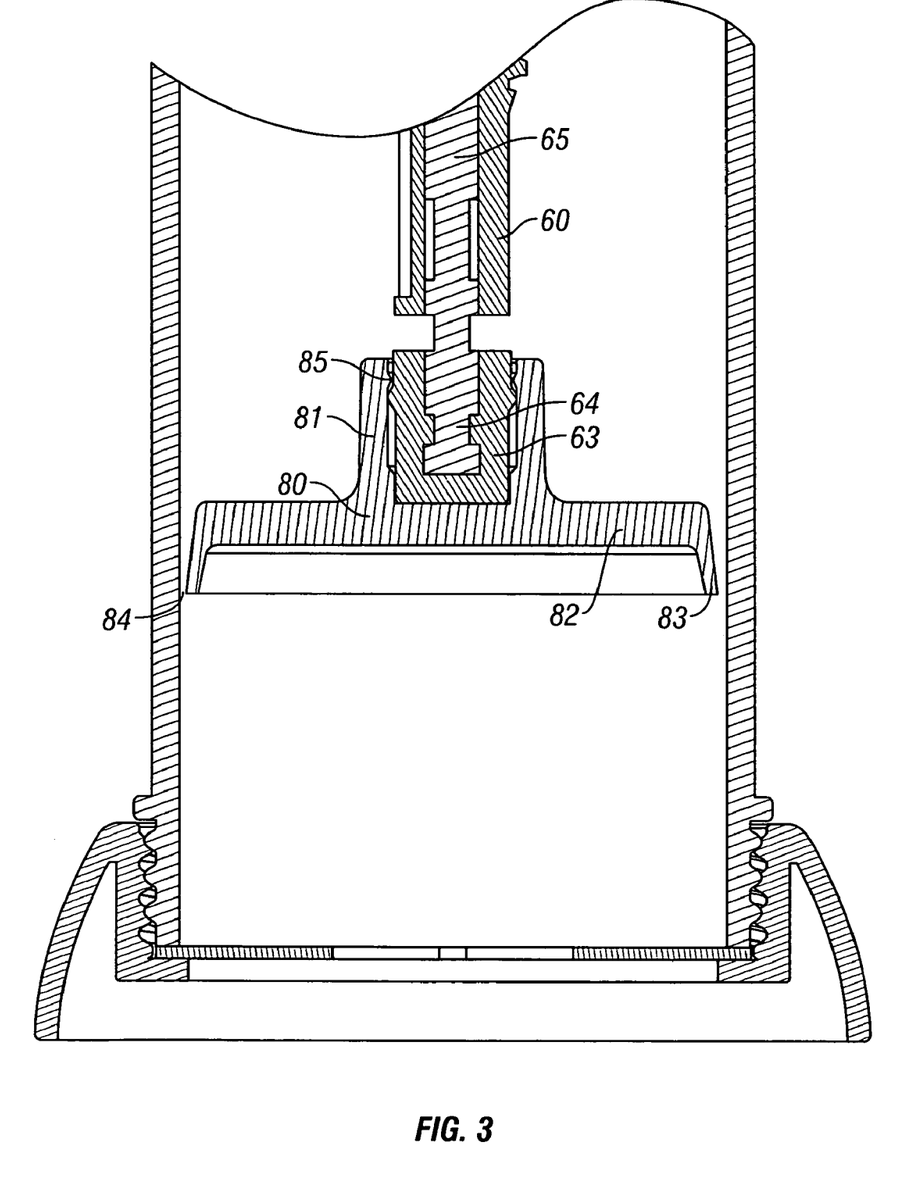
FIG. 3 is a detailed cutaway view of the plunger portion of the cookie press and, in particular, illustrates the interaction of the plunger with the barrel of the cookie press.

The dough being used to make cookies is quite viscous. However, some of it might still slide through the gap 84 between the plunger 80 and the wall of the barrel 50. To minimize the possibility of this happening, or to at least minimize the amount of dough that slips past the plunger, a particular design for the plunger was undertaken: the plunger includes two distinct portions: the plunger disc 82 and the plunger side walls 83. The plunger disc is rigid and strong which prevents it from flexing as the dough is being pushed forwards. On the other hand, the side walls are made very flexible to allow them to flex as the pressure on the dough builds up. The pressure that the dough exerts on the disc causes the side walls to expand and touch the inner walls of the barrel, thereby creating a sliding seal that helps prevent the spillover of the dough. The plunger is attached to the threaded rod by its collar 81 fitting over the plastic plug 63. The collar 81 has an inwardly projecting bump 85 that helps the plunger stay on the plastic plug.

Figure 11:
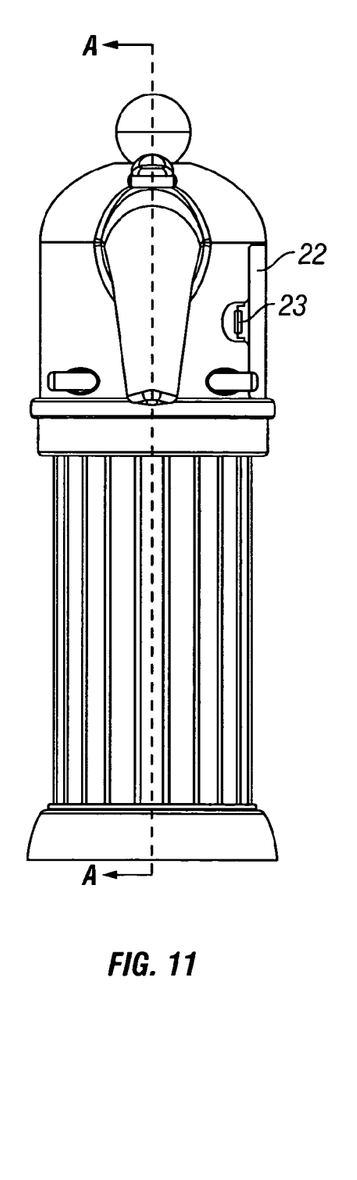
FIGS. 11 and 12 illustrate the operation of the power supply portion of the cookie press, including the battery cover door and a power switch.
Figure 12:
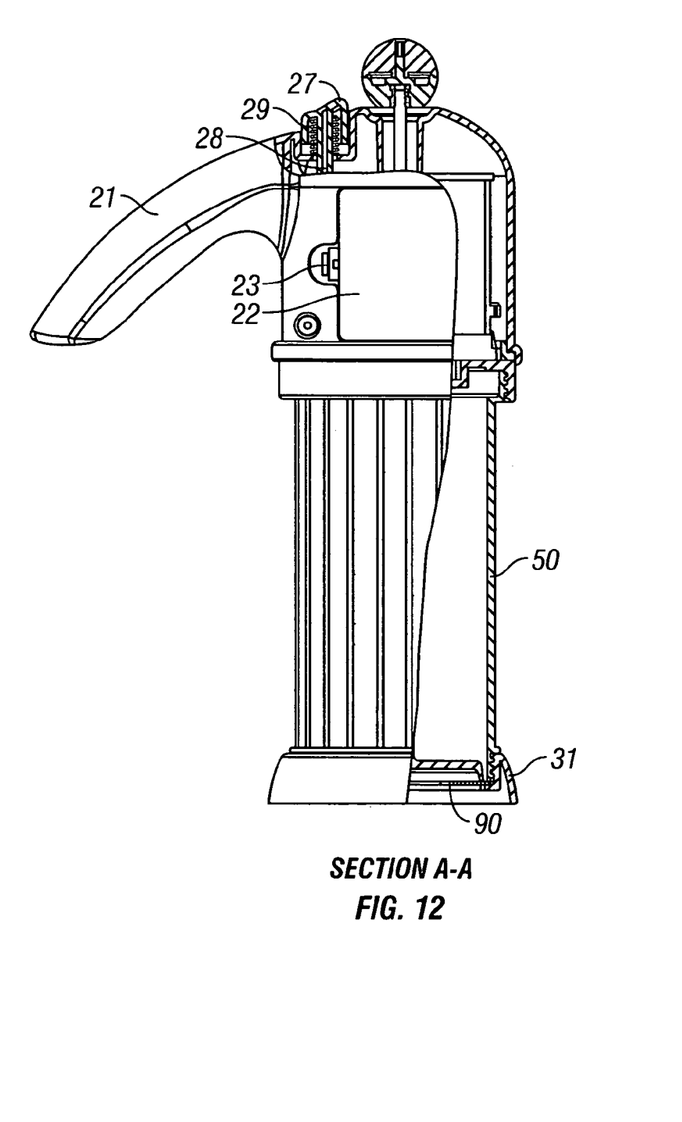

Replacing batteries in appliances that operate on battery power is usually quite involved. This issue is addressed in a manner that the access to the batteries is believed to be quick and intuitive. A large door 22 is provided on the side of the power module for access to the batteries. The clip 23 for unlatching the door is clearly visible. It fits into a large recess 24 in the wall of the housing. Once the door is unclipped, it swings away on hinge-like details 25 that line up with the other side of the opening 26. The door then completely disengages from the power module, fully exposing the batteries for easy removal and replacement with fresh batteries. Returning the door and latching it shut is also simple and intuitive as all the parts visibly fit together—like a large jigsaw puzzle.

The cookie press includes a handle 21 or a gripping portion that projects at an acute angle from the main axis of the cookie press proper. The handle is also slightly curved. Both the angle and the curvature of the handle facilitate a comfortable grip by the user.

An activation switch button 27 is located above the motor. As the switch is pushed downwards by the user, its extension 28 pushes an electric contact 120 against the motor contact 121 that is part of a printed circuit board 122, thereby closing the electric circuit and causing the motor to turn and to activate the threaded rod. The activation switch button 27 is located so as to facilitate its activation by the user's thumb as the user grips the handle. When the user relieves the pressure on the switch button, a built-in spring 29 returns the button to its original position. The contact is thus broken causing the motor and the threaded rod to cease their operation.

The handle and switch as well as the threaded rod disengagement mechanism are designed for ambidextrous operation. The handle and the activation button are symmetrically oriented in relationship to the cylindrical housing. The disengagement mechanism can be activated by pushing the block 103 from its normal position from either the left side or the right side of the unit.

Figure 7:
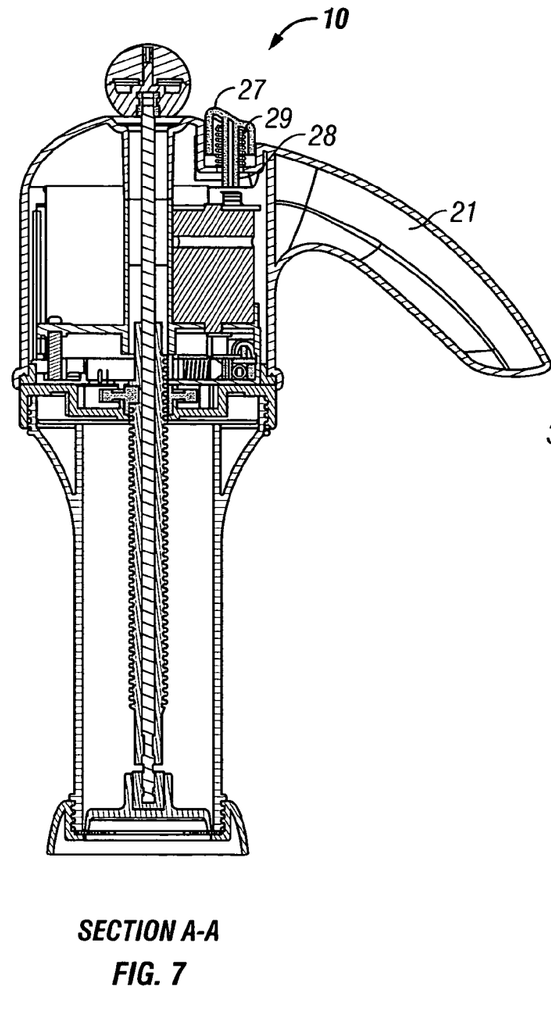
Figure 8:
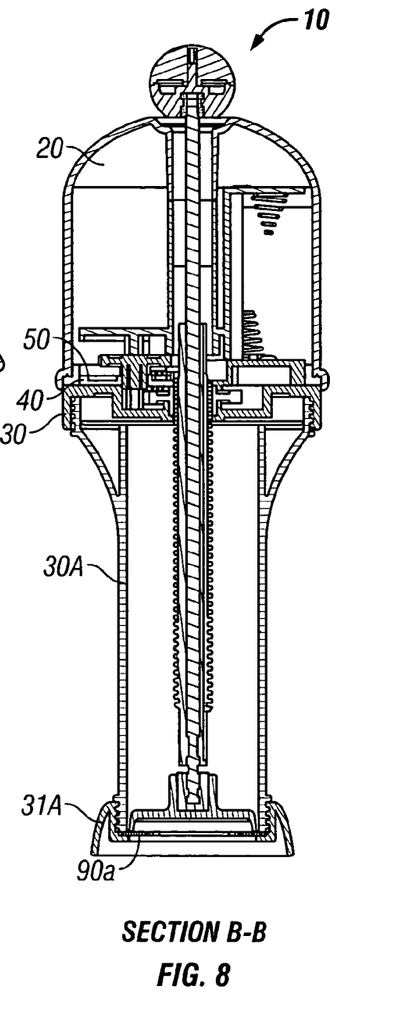
FIG. 8 is a rear cutaway view of the FIG. 7 cookie press.

In order to expand the usability of the cookie press, it is also provided with a small diameter barrel 50A. That barrel is used when the user desires to dispense fillings such as custard cream for stuffing eclairs or cream-puffs as well as for dispensing frosting for decorating cakes and jams and other fillings for filling doughnuts. Since the torque that can be exerted on the dough may be limited by the power of the motor and the batteries, it might be sometimes advantageous to use a smaller barrel when very thick dough is being used. The force exerted by the dough on the mechanism is proportional to the area of the plunger, which is proportional to the square of the diameter of the plunger. Thus, in a barrel that is only 60% of the diameter of the large barrel, a pressure that is 2.7 times higher could be created by the same power mechanism. This may be particularly useful for using the cookie press to make home made pasta, for example.

When the user wants to dispense a cream or a decorating paste, the bottom end of the barrel may be fitted with a conical filling spout, through which the cream or other semi-liquid substance is being delivered.

When the smaller diameter barrel is being used, the plunger attached to the end of the threaded rod is replaced by one of a diameter commensurate with the diameter of the barrel.

The claimed invention is:

1. A hand-held motorized apparatus to press food product, comprising: a housing that houses a motor; a handle that projects from the housing; an elongated barrel to hold the food product; a threaded rod configured for advancement along the elongated barrel as the threaded rod is turned; an extrusion member at an end of the elongated barrel; a plunger coupled to the rod and movable therewith along the elongated barrel to press the food product out the extrusion member; and a coupling mechanism coupling the rotation of the motor to turn the rod, wherein the threaded rod includes a helical thread formed therein and the coupling mechanism includes a stationary mating thread, wherein the helical thread of the rod engages the stationary mating thread, thereby advancing the threaded rod along the elongated barrel as the threaded rod is turned wherein the coupling mechanism is configured such that the helical thread of the rod may be disengaged from the stationary mating thread, thereby inhibiting rotation of the motor from causing the threaded rod to be further advanced along the elongated barrel, wherein the coupling mechanism can be operated by a member having two extensions that extend from either side of the housing to nominally force the stationary mating thread to be engaged with the helical thread of the threaded rod or disengage the stationary mating thread from the helical thread of the threaded rod.

2. The hand-held motorized apparatus of claim 1, wherein the member which nominally forces the stationary mating thread to be engaged slides transverse to the principle axis of the elongated barrel to urge the stationary mating thread to engage and disengage the threaded rod.

3. The hand-held motorized apparatus of claim 2, wherein the extensions of the member which nominally forces the stationary mating thread to be engaged comprises substantially cylindrical ends that extend from opposite sides of the apparatus when alternating between equivalent disengaged positions.

4. The hand-held motorized apparatus of claim 2, wherein the extensions of the member which nominally forces the stationary mating thread to be engaged are substantially cylinders that are disposed symmetrically about the apparatus when in the threaded rod engaging position.

5. The hand-held motorized apparatus of claim 2, wherein the member which nominally forces the stationary mating thread to be engaged comprises:
   a) a spring biased pin having a distal end that directly urges the stationary mating thread forward to the engaged position,
   b) a block having adjacent recesses with the extensions on opposite sides that extend beyond the periphery of the motor housing to move the block transverse to the direction of the spring biased pin, wherein pushing one extension or the other inwardly aligns either recess with the proximal end of the spring biased pin, whereby the spring biased pin urges the stationary mating thread to engage the threaded rod when the proximal end of the spring biased pin is disposed between the adjacent recesses of the block.

6. The hand-held motorized apparatus of claim 5, wherein each extension is biased against urging the block to move in the opposite direction by a spring.

* * * * *